Patented Mar. 1, 1949

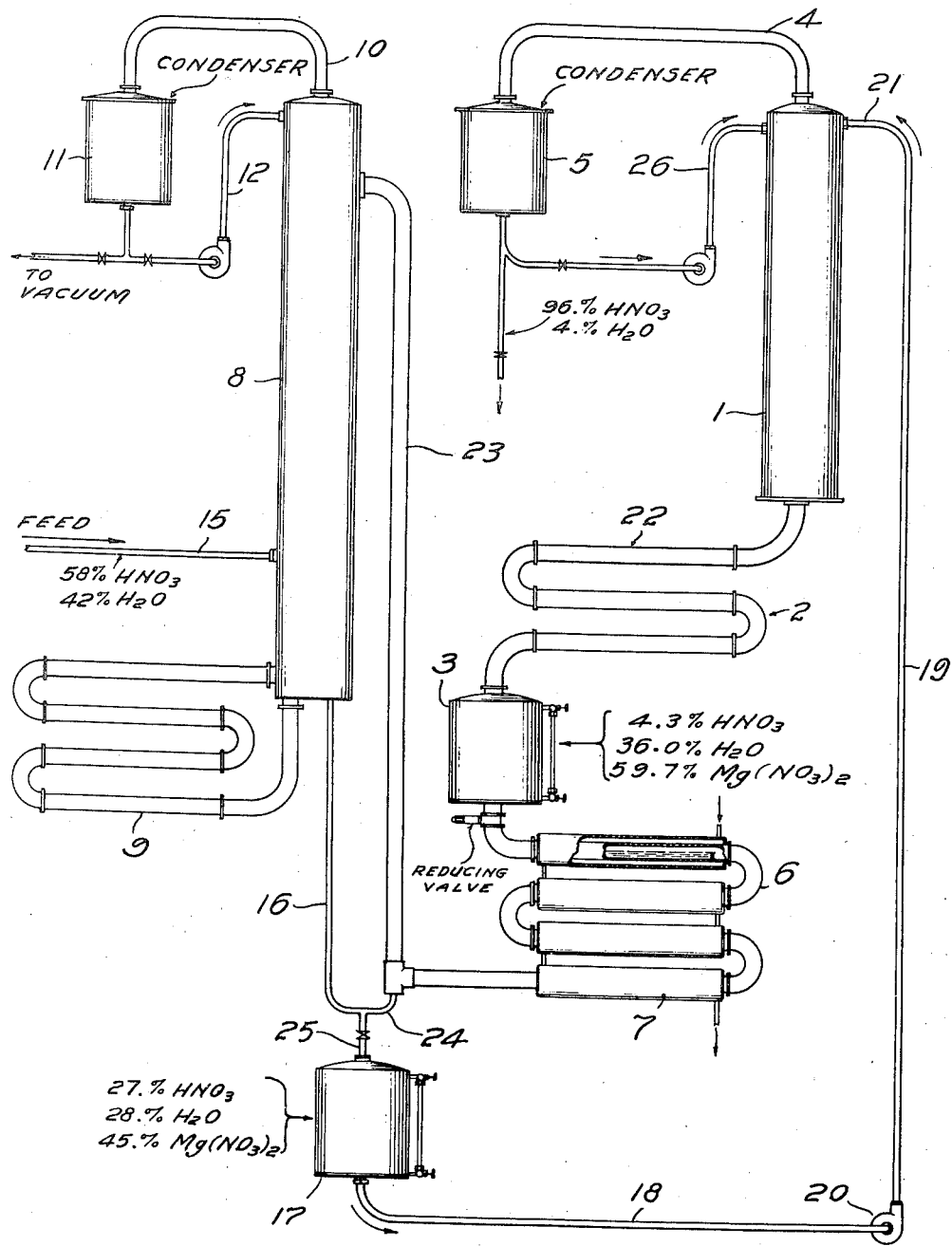

2,463,453

UNITED STATES PATENT OFFICE 2,463,453

NITRIC ACID CONCENTRATION

Alling P. Beardsley, Plainfield, N. J., assignor, by mesne assignments, to Chemical Construction Corporation, New York, N. Y., a corporation of Delaware Application March 29, 1946, Serial No. 658,182

3 Claims. (Cl. 202—68)

This invention relates to an improved process for the concentration of nitric acid and more particularly to a continuous process for the production of concentrated nitric acid fom weak acid by distillation in the presence of a solution of an alkaline earth metal nitrate as a dehydrating agent and the regeneration of said dehydrating solution by boiling off a part only of the water.

It is a well known fact that concentrated nitric acid cannot be produced by simple distillation or fractionation of ordinary nitric acid (by which term is meant 58–65% or weaker nitric acid) because an azeotrope containing 67% nitric acid and 33% water is formed. However, there is a substantial demand for concentrated nitric acid having a $HNO_3$ content on the order of 90–98% and particularly 95–98% for nitration processes such as the nitration of aromatic hydrocarbons, the production of nitrocellulose, etc. The present invention is particularly well suited for concentrating nitric acid obtained from ammonia oxidation plants but can, of course, be used to concentrate weak nitric acid from any other source.

The customary method of concentrating ordinary nitric acid is to add sufficient strong sulfuric acid to remove the water, followed by separation of the concentrated nitric acid by distillation. This process, while now in large-scale commercial use, requires very large quantities of strong sulfuric acid for dehydration purposes and the diluted sulfuric acid of about 73% strength must be recovered and reconcentrated. In order to remove substantially all of the water from the nitric acid the sulfuric acid is usually reconcentrated to about 90–94%. This requires the construction and operation of a sulfuric acid concentration unit in conjunction with an ammonia oxidation unit, which adds greatly to the cost of operation. In addition to this, high silica iron alloys are required in the concentration apparatus since this is the only material that will efficiently withstand solutions containing both sulfuric and nitric acid. High silica iron alloys are very fragile, very difficult to work, and very expensive.

The use of sulfuric acid as a dehydrating agent in concentrating nitric acid is objectionable also in connection with certain heat losses. There is a large sensible heat loss involved in the discharge of hot spent acid from the nitric acid concentrator and another in the discharge of hot concentrated acid from the sulfuric concentrator and still another in the discharge of hot waste gases.

Accordingly it is a principal object of this invention to provide in a nitric acid concentration process a method which is capable of regenerating the dehydrating agent by simple boiling. Another object is to provide in such a system a process whereby there is substantially no loss of the nitric acid. A further object is to provide a process which will allow the use of high chrome alloy steels in the apparatus. Still another object is to provide a system in which the sensible heat in the dehydrating agent to be regenerated is conserved.

The invention in its broader aspects is based on the distillation of aqueous nitric acid in the presence of a strong dehydrating agent consisting of a solution of an alkaline earth metal nitrate, obtaining a major portion of nitric acid as concentrated nitric acid from the distillate and regenerating the dehydrating agent by boiling off a part only of the water and then recycling the thus regenerated solution. Essentially my invention is a continuous nitric acid concentration process which comprises mixing weak nitric acid with an aqueous solution of magnesium nitrate, subjecting the mixture to distillation and removing as distillate a major part of the nitric acid as 90–98% nitric acid, taking off as a still residue a solution containing the magnesium nitrate, the remainder of the water and a small portion of the nitric acid. The still residue is then boiled under reduced pressure until it is substantially free of the remaining nitric acid and until the magnesium nitrate-water ratio is about 78% $Mg(NO_3)_2$. When the magnesium nitrate-water ratio has reached this value the dehydrating solution is considered to be regenerated and it is then returned for admixture with more weak acid. The nitric acid and water vapors obtained by boiling the still residue contain about 18% nitric acid. They are passed to a fractionating tower equipped with reflux and are separated in the tower into water which is drawn off at the top and discarded, and weak nitric acid which is drawn off at the bottom for admixture with more weak nitric acid and the regenerated solution of dehydrating agent and recycled for concentration.

Aqueous solutions of magnesium nitrate in various concentrations are powerful dehydrating agents when used for concentrating nitric acid and furthermore they have the advantage that their dehydrating capacity can be regenerated by simply boiling off any excess water. Thus for example by distilling a solution containing 148.7 g. of magnesium nitrate, and 94.3 g. of $HNO_3$ and 94 g. of water I find that I can obtain an initial distillate of 96.6% nitric acid from the mixture which is much stronger than the nitric water ratio in the still. More than 80% of the nitric acid present can be distilled off at a strength above the 67% azeotrope, the strength of course declining during the collection of this 80% and the temperature in the still rising from an initial value of 124° C. As the distillation proceeds the strength of the distillant acid declines, finally reaching 0 at the point where the temperature in the still has risen to 200° C. The water content of the remaining solution can be reduced to any value without losing or destroying any of the magnesium nitrate by simply continuing the application of heat. To reduce the solution to 78% magnesium nitrate requires a final temperature of 210° C. but this may also be accomplished by heating under 26" of vacuum at 130° C.

My invention may be further described with reference to the accompanying drawing, the single figure of which is a flow sheet in which the various pieces of equipment are illustrated diagrammatically. The operation of this apparatus will be described in conjunction with the use of solutions of magnesium nitrate as a dehydrating agent which are the preferred dehydrating agents. It should be understood, however, that the invention in its broader aspects is not limited to solutions of this particular salt since I have found that solutions of an alkaline earth metal nitrate are useful and that this is particularly true of solutions of calcium nitrate and zinc nitrate. These salts are hygroscopic, water soluble and have a high affinity for water. In addition water can be driven off these solutions by simple boiling or heating. The introduction of impurities is also avoided since the salts are nitrate.

Referring to the drawing, the concentrating apparatus comprises generally a main fractionating column 1, steam heated reboiling tubes 2, a receiver 3 for residue, and an overhead line 4 and condenser 5 for the condensation and removal of concentrated nitric acid. A reflux line 26 is provided to feed concentrated acid into the column 1 at any desired reflux ratio.

The remainder of the apparatus is primarily a reconcentration system for regenerating the aqueous magnesium nitrate solution or other dehydrating agent and includes a set of boiling tubes 6, a second fractionating column 8 with steam heated reboiling tubes 9, an overhead line 10, a condenser 11 and a reflux line 12 for reintroducing condensate into the top of the column. Ordinary nitric acid is preferably supplied to the process through a feed line 15 and is introduced into one of the lower plates of the column 8 in order to obtain a preliminary concentration, which is desirable as it reduces the amount of water that must be separated in the column 1. It is equally feasible, however, to introduce the feed acid into the return line 16, which drains from the base of the column 8 into the storage tank 17, or even into the tank 17 itself. The operation of the process will be illustrated by the following specific example:

58% nitric acid is supplied as feed through the line 15 and reaches the storage tank 17 as 64% nitric acid, the remaining water having been removed in the column 8. Sufficient magnesium nitrate and water are present in this tank to make a mixture containing about 45% magnesium nitrate, 27% nitric acid and 28% water, resulting from the blending of 64% nitric acid with 78% magnesium nitrate solution. This mixture is pumped through lines 18 and 19 by means of pump 20 into the inlet 21 at the top of column 1, in which it flows downwardly by gravity against rising vapor supplied by the boiling tubes 2. Acid of about 96% HNO$_3$ distills off at the top of the column, the amount of real HNO$_3$ at such strength being about 88% of the HNO$_3$ in the feed. The temperature at the top of the column is about 125° C. and that at the lowest boiling tube 22 is about 145° C. when the entire operation is carried on at atmospheric pressure.

The still residue which collects in tank 3 contains all the magnesium nitrate, nearly all the water and about 12% of the nitric acid of the mixed feed. The regeneration of the dehydrating agent is accomplished by boiling from this residue sufficient water so that the ratio of magnesium nitrate to water will be about 78% which, I have found, is a good concentration for removing the excess water from feed acid of the strength used. In this concentrating operation, all of the remaining nitric acid is also vaporized, the mixed vapors being about 16% HNO$_3$.

Although the concentration could be carried out at atmospheric pressure, it is greatly preferable to apply a vacuum to the regenerating system in order to avoid the final temperature of about 210° C. which would otherwise have to be used. Therefore, in the present example, a 26" vacuum is applied which reduces the final temperature in the boiling tubes 6 to about 130° C. It should be understood, however, that the regeneration system may be operated at any desired vacuum and, therefore, at any desired temperature and this is one of the advantages of the invention.

The regeneration of the magnesium nitrate solution or other dehydrating agent takes place in the boiling tubes 6, which are preferably provided with internal dams as shown and heated by steam supplied to the jackets 7. Similar steam jackets are also preferably applied to the tubes 2 and 9, but are omitted from the drawing for greater clarity of illustration. Nitric acid vapors and water vapor generated in the tubes 6 pass through the vapor line 23 to a point well above the middle of the column 8. The reconcentrated or regenerated magnesium nitrate solution passes through lines 24 and 25 into the tank 17. In this tank it mixes with further quantities of feed acid, which may be preconcentrated in the column 8, and the mixture is returned to the fractionating step through lines 18 and 19 by the action of pump 20.

The chief function of the column 8 is to separate the weak nitric acid vapor into water overhead, which passes to the condenser 11, and medium strength nitric acid bottoms which become mined with the feed acid in the lower part of the still. Theoretically, the bottoms could be 67% nitric acid but 64% acid is considerably easier to obtain and requires only a 1:1 reflux ratio at the top of the column.

From the foregoing description of a preferred embodiment of the invention, it will be apparent that there are other modes of operating the concentration apparatus. Thus for example it is possible to use a lower concentration of the alkaline earth metal nitrates such as magnesium nitrate and to use a higher reflux ratio at the top of tower 1. It is also possible to use such a high concentration of the nitrate salt that simple distillation can yield concentrated nitric acid. Another possibility is to maintain conditions such that the dehydrating solution is spent when it will no longer yield vapors in which the nitric acid content is above the azeotrope of 67% HNO₃. In the regenerating system it is possible, although it may not be economical, to simply boil the solution until sufficient water is removed to regenerate the solution without recovering any of the remaining nitric acid.

It will be noted that my process provides a continuous method for concentrating weak nitric acid in which the dehydrating agent is a solution of an alkaline earth metal nitrate which can be easily regenerated by simple boiling and that this process can be carried out with substantially no loss of nitric acid, that it can be carried out in high chrome alloy steels such as stainless steel, and that the sensible heat in the solutions to be regenerated is not wasted.

This application is a continuation-in-part of my copending application Serial No. 573,289, filed January 17, 1945, now abandoned.

What I claim is:

1. A continuous nitric acid concentration process which comprises mixing nitric acid containing more than 33% water and an aqueous solution of magnesium nitrate containing about 78% magnesium nitrate, subjecting the mixture to fractional distillation, condensing as distillate a major part of the nitric acid as 90–98% nitric acid, returning a portion of said 90–98% nitric acid to the distillation as reflux, taking off as still residue the magnesium nitrate, the remaining water and the remaining nitric acid and simultaneously boiling off from said still residue, under reduced pressure substantially all of the said remaining nitric acid and sufficient water to regenerate said still residue to a solution having a magnesium nitrate content of about 78% and returning said solution for admixture with more weak acid, fractionally separating and condensing the nitric acid and water vapors resulting from said boiling of said still residue into weak nitric acid and water, discarding said water and returning said weak nitric acid to the concentration step.

2. A continuous nitric acid concentration process which comprises mixing weak nitric acid and a concentrated solution of magnesium nitrate, subjecting the mixture to fractional distillation, condensing a portion of the distillate as concentrated nitric acid, returning a portion of the concentrated nitric acid to the distillation as reflux, taking off as still residue the magnesium nitrate, the remaining water and the remaining nitric acid and simultaneously boiling off from said still residue substantially all of the said remaining nitric acid and sufficient water to regenerate said still residue to a solution having the magnesium nitrate content of said concentrated magnesium nitrate solution, fractionally separating and condensing at least a portion of the nitric acid and water vapors resulting from said boiling of said still residue into weak nitric acid and water, discarding said water, and returning said weak nitric acid to the concentration step.

3. A continuous nitric acid concentration process which comprises mixing weak nitric acid and a concentrated solution of an alkaline earth metal nitrate, subjecting the mixture to fractional distillation, condensing a portion of the distillate as concentrated nitric acid, returning a portion of the concentrated nitric acid to the distillation as reflux, taking off as still residue the alkaline earth metal nitrate, the remaining water and the remaining nitric acid and simultaneously boiling off from said still residue substantially all of the said remaining nitric acid and sufficient water to regenerate said still residue to a solution having an alkaline earth metal nitrate content of said concentrated alkaline earth metal nitrate solution, fractionally separating and condensing at least a portion of the nitric acid and water vapors resulting from said boiling of said still residue into weak nitric acid and water, discarding said water, and returning said weak nitric acid to the concentration step.

ALLING P. BEARDSLEY.

REFERENCES CITED

The following references are of record in the file of this patent:

UNITED STATES PATENTS

| Number | Name | Date |
| --- | --- | --- |
| 864,217 | Wolffenstein | Aug. 27, 1907 |
| 1,163,174 | Raschig | Dec. 7, 1915 |
| 1,772,122 | Zeissberg | Aug. 5, 1930 |
| 1,832,853 | Bennett | Nov. 24, 1931 |
| 1,922,278 | Davis | Aug. 15, 1933 |
| 1,936,836 | Gorhan | Nov. 28, 1933 |
| 2,081,189 | Wiezevich | May 25, 1937 |
| 2,324,955 | Rupp et al. | July 20, 1943 |
| 2,357,095 | Evans | Aug. 29, 1944 |

FOREIGN PATENTS

| Number | Country | Date |
| --- | --- | --- |
| 62,714 | Germany | June 14, 1892 |
| 398,320 | Germany | July 7, 1924 |